United States Patent [19]
Burkes et al.

[11] Patent Number: 6,023,715
[45] Date of Patent: Feb. 8, 2000

[54] METHOD AND APPARATUS FOR CREATING AND ORGANIZING A DOCUMENT FROM A PLURALITY OF LOCAL OR EXTERNAL DOCUMENTS REPRESENTED AS OBJECTS IN A HIERARCHICAL TREE

[75] Inventors: Daniel F. Burkes; William H. Jones, both of Atlanta; John W. Kish, Rosewell, all of Ga.; Paul B. Moody, Londonderry, N.H.; Eliza H. Royal, Atlanta, Ga.

[73] Assignee: International Business Machines Corporation, Armonk, N.Y.

[21] Appl. No.: 08/638,908

[22] Filed: Apr. 24, 1996

[51] Int. Cl.[7] .................................................. G06F 17/27
[52] U.S. Cl. ........................................... 707/514; 707/513
[58] Field of Search .................................... 707/514, 511, 707/515, 513; 345/341, 350

[56] References Cited

U.S. PATENT DOCUMENTS

| | | | |
|---|---|---|---|
| 5,150,458 | 9/1992 | Masuzaki et al. | 345/435 |
| 5,280,583 | 1/1994 | Nakayama et al. | 395/200.35 |
| 5,339,389 | 8/1994 | Bates et al. | 345/331 |
| 5,339,391 | 8/1994 | Wroblewski et al. | 345/341 |
| 5,499,330 | 3/1996 | Lucas et al. | 707/514 |
| 5,500,929 | 3/1996 | Dickinson | 345/356 |
| 5,506,951 | 4/1996 | Ishikawa | 345/341 |
| 5,557,722 | 9/1996 | DeRose et al. | 707/513 |
| 5,581,275 | 12/1996 | Glei et al. | 345/123 |
| 5,634,064 | 5/1997 | Warnock et al. | 707/513 |
| 5,671,428 | 9/1997 | Muranaga et al. | 707/511 |
| 5,680,561 | 10/1997 | Amro et al. | 345/341 |

*Primary Examiner*—Stephen S. Hong
*Attorney, Agent, or Firm*—Kudirka & Jobse, LLP

[57] ABSTRACT

An authoring tool allows users to create complex documents from a base division model, the model includes a plurality of pointers allowing the divisions to be interconnected to one another dynamically to create a complex hierarchy of divisions, including nested divisions. The content of a division may be located externally to the actual document and authoring tool system. A display mechanism is further disclosed for instantaneously determining the division name and page number within a document from a graphic user display.

44 Claims, 11 Drawing Sheets

METHOD AND APPARATUS FOR CREATING AND ORGANIZING A DOCUMENT FROM A PLURALITY OF LOCAL OR EXTERNAL DOCUMENTS REPRESENTED AS OBJECTS IN A HIERARCHICAL TREE

COPENDING APPLICATIONS

This application is the one of four sister patent applications filed on an even date herewith and commonly assigned, including U.S. patent application Ser. No. 08/638,904, entitled "OBJECT-ORIENTED DOCUMENT VERSION TRACKING METHOD AND APPARATUS", and U.S. patent application Ser. No. 08/638,992 entitled "METHOD AND APPARATUS FOR DISPLAYING IN CONTEXT EDITS MADE BY MULTIPLE EDITORS AND CONSOLIDATING THE EDITS BY ELIMINATING DUPLICATE CONTEXT MATERIAL" and U.S. patent application Ser. No. 08/637,310, entitled "METHOD AND APPARATUS FOR DISPLAYING MODELESS BAR INTERFACES IN A COMPUTER SYSTEM". The subject matter of the above-identified copending patent applications is hereby incorporated by reference.

FIELD OF THE INVENTION

This invention relates generally to improvements in computer systems and, more particularly, to a system for creating documents as a hierarchy of divisions.

BACKGROUND OF THE INVENTION

Word processing software has revolutionized the manner in which people generate documents and, in some cases, has created whole industries such as the desktop publishing industry. However, when documents are created by more than one author, or are very large and complex, current word processing applications often lack the functionality necessary to organize and manage such documents. In particular, in collaborative efforts involving more than one author, segments or "divisions" of a complex document are often written by different people, such divisions having different styles and formats. Further, it is increasingly desirable to include in a master document, divisions which may not only have been written by a separate author, but which are in a different word processing format, and may even be located external to the authors local area network. Although some word processing applications, such as Lotus 1-2-3, commercially available from Lotus Development Corp, Cambridge, Mass., a subsidiary of International Business Machines Corporation, have provided facilities such as Work Sheet Tabs, to divide and organize a spreadsheet document, it has not been possible to create nested divisions, i.e., a division within a division. Further, such applications do not provide the ability to link external documents to the current document or to scroll contiguously through an entire document, including the externally linked portions thereof. In addition, it is often desirable to have different authors work on different divisions of a document concurrently while the document is being created. Further, it is desirable to access exactly a specific page within a document using a scroll bar, without having to manipulate the scroll bar several times before reaching the desired location.

Accordingly, there is a need for an authoring tool which allows for the creation of documents having complex organizational structures. More particularly, there is a need for word processing software which enables the author to create nested divisions within the document. A need further exists for an authoring tool which enables users to include in a document, material external to the author's immediate authoring system. Still further, a need exists for a document authoring tool which enables the author to contiguously scroll through an entire document including, content within nested divisions and divisions containing externally linked material. Even further a need exists for an authoring tool which enables multiple authors to work concurrently on different divisions of the same document. Yet another need exists for an authoring tool which allows exact accessing of the particular page within a document by means of a scroll bar.

SUMMARY OF THE INVENTION

The above and other objects are achieved with an inventive authoring tool which allows for creation of documents having relatively limitless nesting of division within the main document. Each division within the main document may have its own style, format and content. Division content may even be located externally of the main document and the author's computer system. Graphic elements, in the form of divider tabs, are associated with each division in the main document structure. The tabs can be displayed to provide a visual reference as to location within the main document, and, may be manipulated graphically to both navigate through the document and reorganize the document. In addition, the main document may be viewed in a contiguously scrolling manner from a single view. The implementation of divisions within a master document enables concurrent creation and/or editing of divisions within the document. For implementations including a vertical scroll bar, a display window adjacent the scroll bar dynamically displays the name of the division and a page number at the current cursor position within the scroll bar.

In accordance with one embodiment, the present invention discloses a computer program product for use with a computer system having a visual display. The computer program product includes a computer useable medium having program code embodied in the medium for creating documents. Program code is further included for creating a parent division and a child division, the child division having a pointer to the parent divisions, a pointer to subsequent child divisions and a sibling pointer to other child divisions having the same parent. Program code is further included for allowing the user to manipulate the pointer values, and thereby the parent/child relationships among the divisions.

In another embodiment, the invention discloses a computer program product for use with a computer system having a visual display. The computer program product includes a computer usable medium having program code embodied in the medium and capable of displaying a document, the document comprising one or more divisions, each having a plurality of pages. Program code is further included for generating a scroll bar for selecting locations within the document and for displaying the name of a division and the page number at a location within the document, as represented by the position of a cursor within the scroll bar.

BRIEF DESCRIPTION OF THE DRAWINGS

The above and other features, objects and advantages of the invention will be better understood by referring to the following detailed description in conjunction with the accompanying drawing in which.

DETAILED DESCRIPTION

Figure 1:
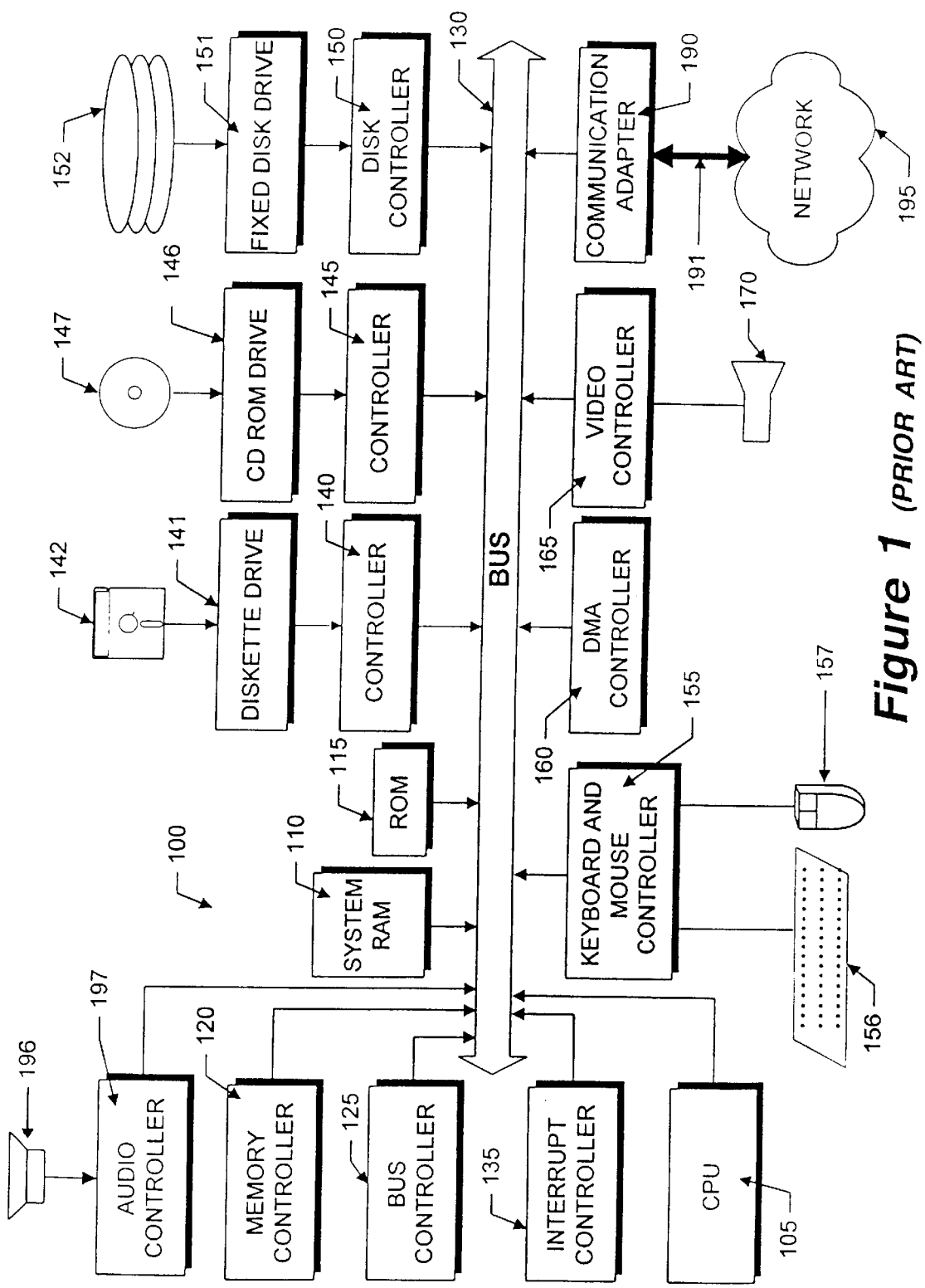
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RMA 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tablet may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Figure 2:
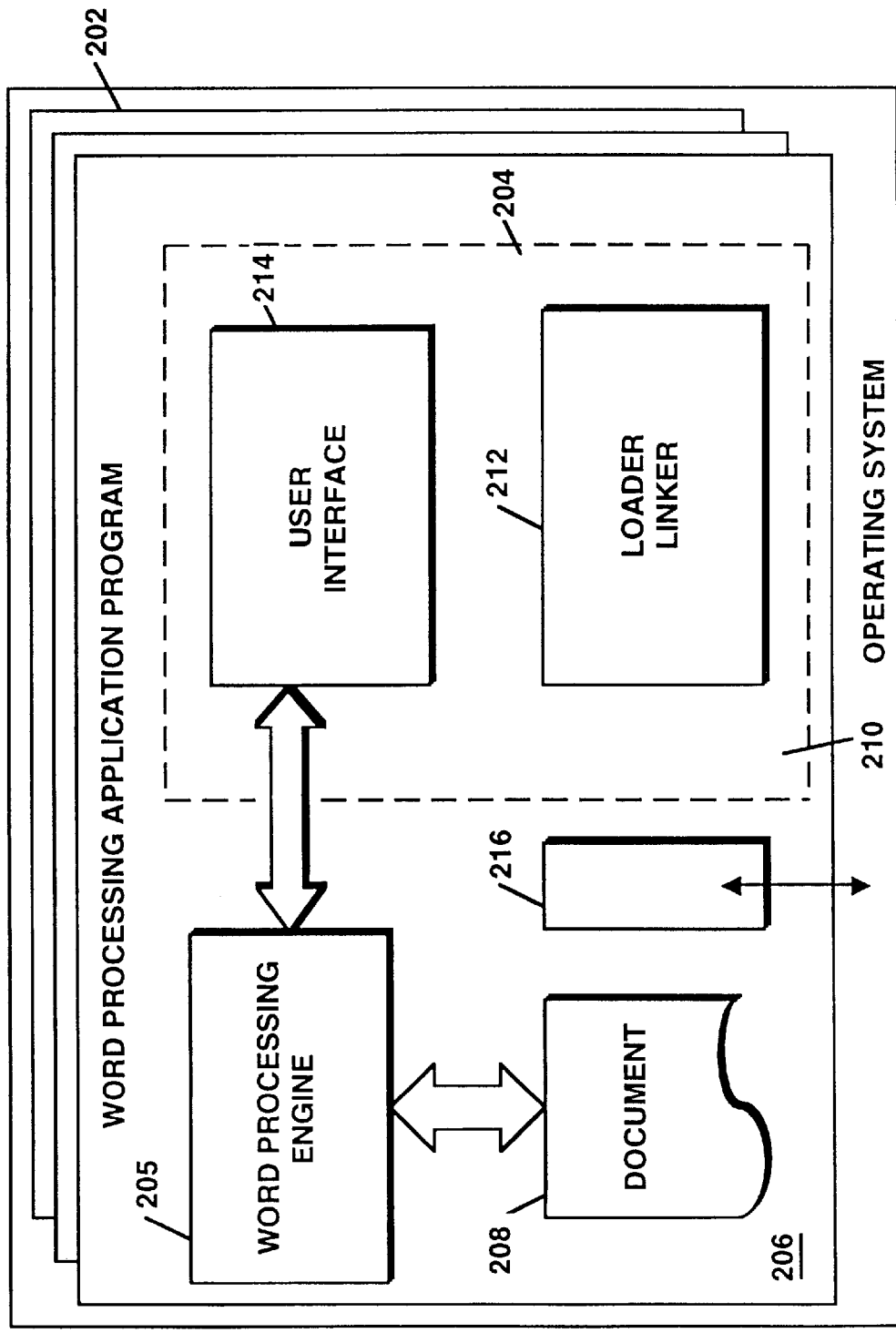
FIG. 2 is a schematic block diagram of the elements comprising the inventive authoring tool.

Operation of computer system 100 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and I/O services, among things. FIG. 2 illustrates schematically the inventive authoring tool 204 and its components as well as other system components with which the tool interacts. In particular, an operating system 200 resident in system memory and running on CPU 105 coordinates the operation of the other elements of computer system 100. The present invention may be implemented with any number of commercially available operating systems including OS/2, UNIX and DOS, etc. One or more applications 202 such as word processors, editors, spread sheets, compilers, etc., execute in order to control the operating system 200. If operating system 200 is a true multitasking operating system, such as OS/2, multiple applications may execute simultaneously.

Authoring tool 204 may be implemented as an integral part of a document authoring application, such as a word processor. In particular, a word processing application suitable for use with the present invention, and to which the illustrative embodiment of the invention will be described, is Lotus Word Pro™, 96 Edition, commercially available from Lotus Development Corporation, Cambridge, Mass., a subsidiary of International Business Machines Corporation. In the illustrative embodiment, authoring tool 204 is integrated into a word processing application 206. Word processing application 206 further comprises word processing engine 205, a loader/linker 212, and a network interface 216, and a user interface 208.

In a preferred embodiment, application 206 and tool 204 are implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these functions appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Accordingly, the data structures used to represent documents within application 206 maybe objects or groups of objects. In particular, a document, in accordance with the invention resides in system memory as a network of objects interconnected through object pointers, as explained hereinafter.

Figure 3A:
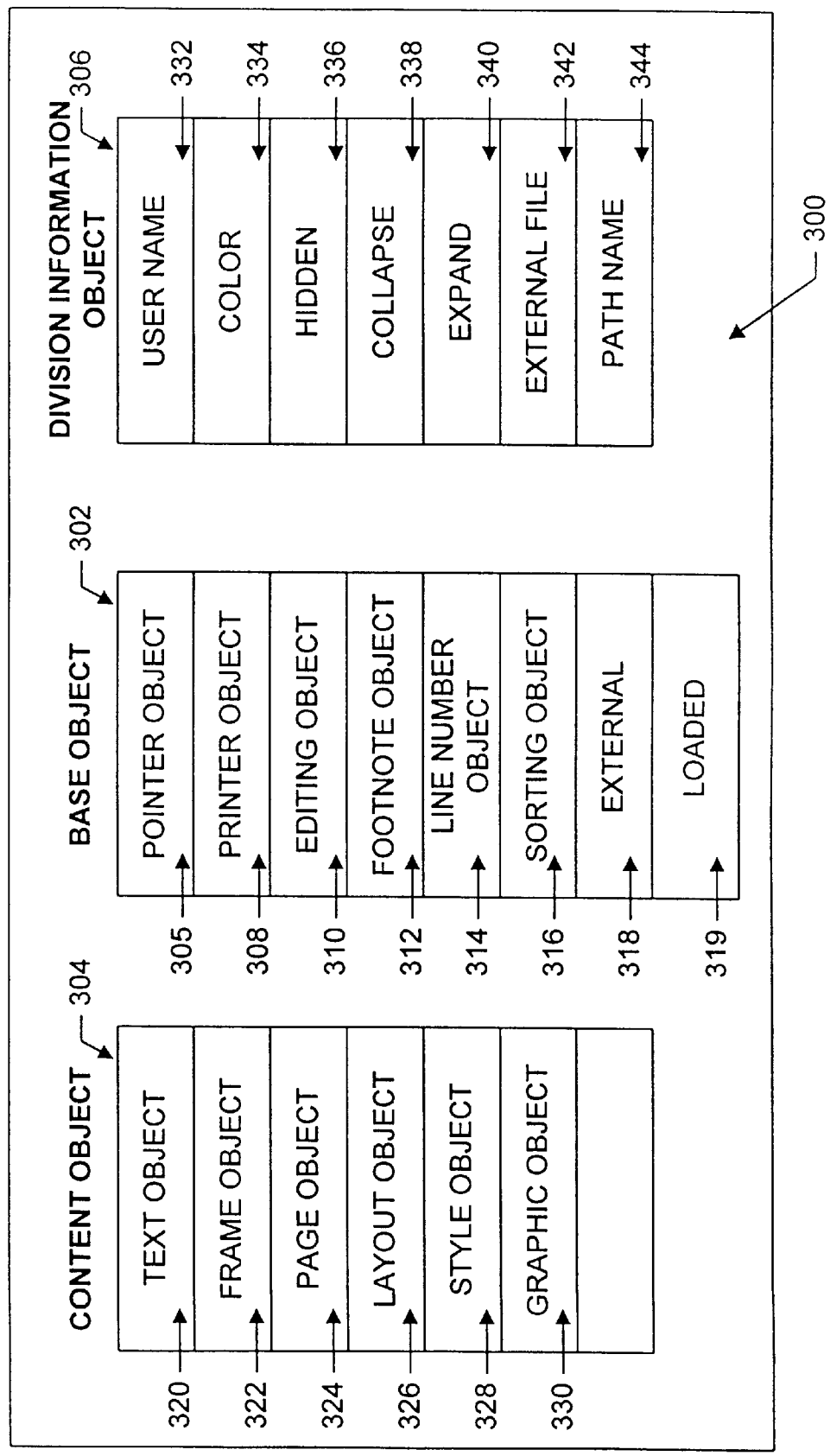
FIGS. 3A–B illustrate schematically the base document object and a pointer object in accordance with the present invention.

FIG. 3A illustrates schematically the object structure of a document 300 capable of interacting with authoring tool 204 and word processing application 206. Specifically, document object 300 comprises a base object 302, a content object 304, and a division information object 306. As will be described hereafter in greater detail, master documents created with the inventive authoring tool may comprise a hierarchical structure of parent and child documents, possibly in a nested configuration. All parent and child documents, in turn, are initialized from the same structure, i.e. document object 300, which serves a fundamental unit for constructing a network of division collectively behaving as a master document.

Base object 302 comprises a collection of other objects. In particular, base object 302 comprises a pointer object 305, a printer object 308, and editing object 310, a footnote object 312, a line number object 314, a sorting object 316, an external attribute 318 and a loaded attribute 319. It will be obvious to those reasonably skilled in the arts that, except for pointer object 305, other objects may be added to or deleted from, base object 302 depending on the exact implementation thereof.

Figure 3B:
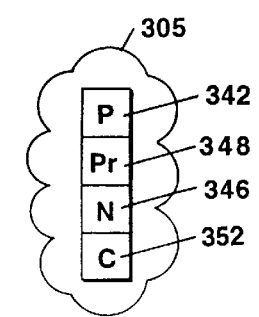

FIG. 3B illustrates pointer object 305 schematically in greater detail. In particular, pointer object 305 comprises a parent pointer 350, a child pointer 352, a previous pointer 348 and next pointer 346. In the illustrative embodiment, pointers 346–352 are implemented with object pointers, i.e. an object that contains, as an attribute, a real pointers. More specifically, pointer 346–352 are implemented with document object pointers which, based on the values of external attribute 318 and loaded attribute 319, determine whether the pointer is referencing another division external to the master document. If the document object detects an external document it is capable of performing methods, using the external file attribute 342 and path name attribute 344 of division information object 306, as explained hereinafter, to load and link the external subject matter into local system memory when appropriate. When required, such as when an object is saved to memory, the object pointers can be virtualized, i.e., converted to a form meaningful to a disk or memory format. The interconnection of a plurality of object pointers from different divisions within a document is described with reference to FIG. 4B hereinafter.

Referring again to FIG. 3A, printer object 308 contains data members relative to the printing of document object 300, and is capable of performing methods on such data members. Editing object 310 contains data members relative to editing of document object 300, particularly, which authors on a system have editing rights therefore, and is capable of performing methods on such data members. Footnote object 312 contains data members relative to implementing footnotes within document object 300, and is capable of performing on such data members. Line number object 314 contains data members relative to the implementation of line numbers within document object 300, and is capable of performing methods on such data members. Sorting object 316 contains data members relative to the sorting of object document 300, and is capable of performing methods on such data members.

Content object 304 contains member objects whose data members, in turn, comprise the actual data content of the document. Specifically, content object 304 comprises a text object 320, a frame object 322, a page object 324, a layout object 326, a style object 328, and a graphic object 330. Text object 320 comprises data members relative to the actual text contained within the document object 300, and is capable of performing methods on such data members. Frame object 322 contains data members relative to the frame format within the document object 300, and is capable of performing methods on the frame object data members. Page object 324 contains data members relative to the page layout of object document 300, and is capable of being performed on such data members. Style object 328 contains data members relative to the style of the document object 300, and is capable of performing methods on such data members. The graphic object 330 contains data members relative to graphics contained within data object 300, and is capable of performing methods on such data objects. Content object 304 may contain multiple copies of any of the above-described objects. For example, content object 304 may contain multiple text objects, multiple frame objects, etc. Conversely, if no graphics are present in the document, content object 304 may be void of a graphic object 330. As will be obvious to those skilled in the art the actual number and type of objects contained within content object 304 depends on the division content itself.

In addition to base object 302 and content object 304, document object 300 comprises a division information object 306 containing object attributes. Specifically, division information object 306 comprises user name attribute 332, color attribute 334, hidden attribute 336, collapse attribute 338, an expand attribute 340, and external file attribute 342 and a path name attribute 344. User name attribute 332 comprises data relative to the name of the division, as defined by the user. Color attribute 334 comprises data relative to the color selection of the graphic tab associated with the division, in accordance with the illustrative embodiment. Hidden attribute 336 comprises data relative to whether the divider tab is visible to the user. Collapse attribute 338 comprises data relative to whether the divider tabs, in the case of a nested division, are presented in a visually condensed manner. Expand attribute 340 comprises data members relative to whether the group divider tab is displayed in an expanded format. External file attribute 342 comprises data relative to the name of a content file external to the document in the computer system. Path name attribute 344 comprises data describing the path name to the external file described in external file attribute 342.

Figure 4B:
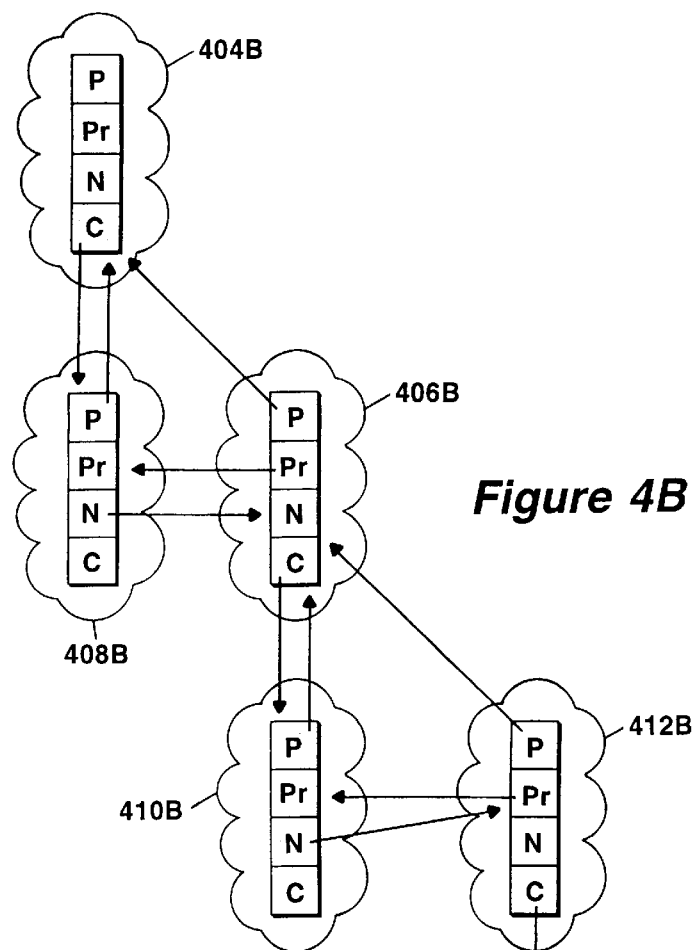
FIGS. 4A–B illustrate schematically the hierarchical organizational structure of an exemplary document in accordance with the invention.
Figure 4A:
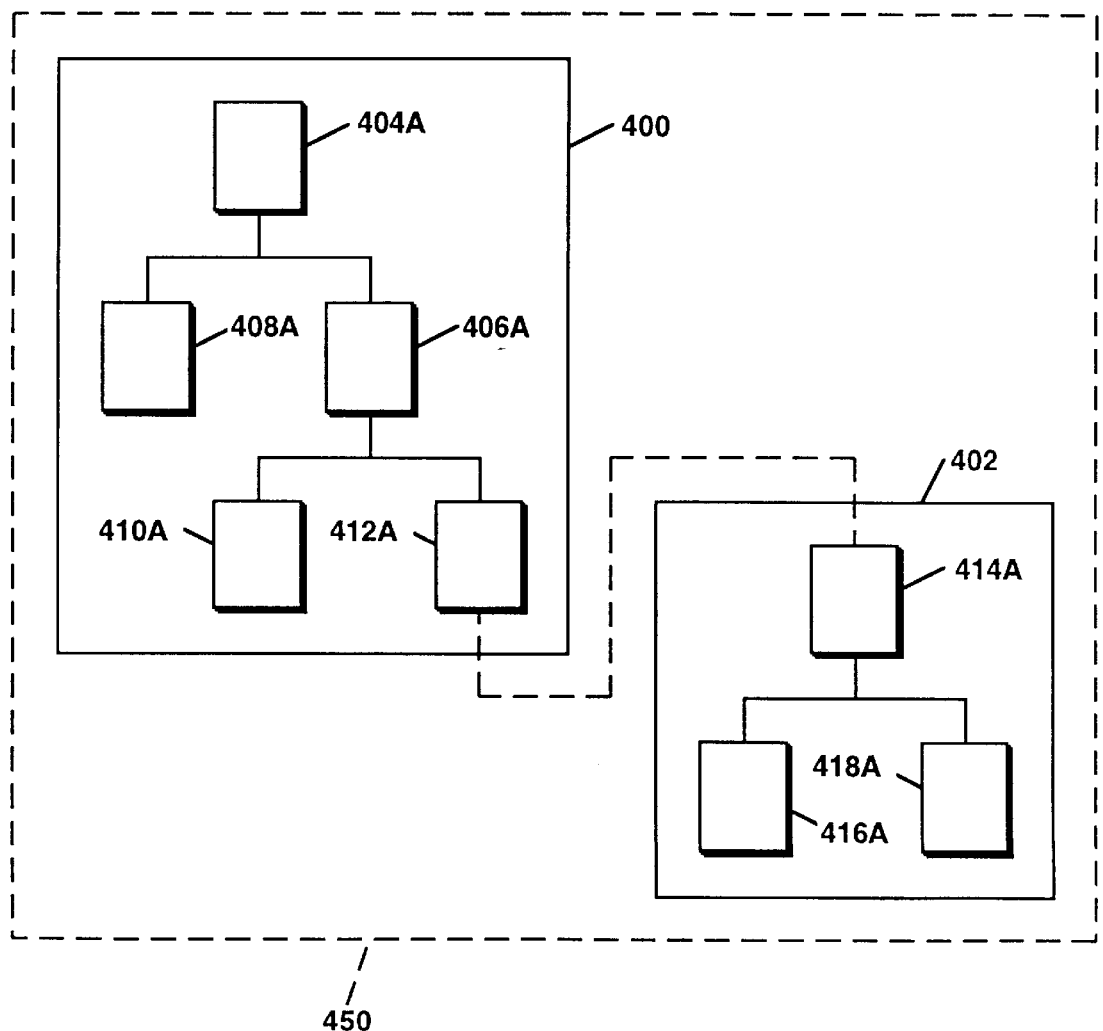

FIGS. 4A–B illustrate an exemplary master document 450 comprising a host document 400 having nested divisions, at least one of which has a link to an external document 402. Specifically, FIG. 4A illustrates a master document 450 generated in accordance the inventive authoring tool 204. As described previously, a master document, according to the present invention, may comprise a hierarchical arrangement of parent and child divisions, each parent and child division having the basic object structure of object document 300 described previously. When a new master document 450 is created using application 206, word processing engine 205 in conjunction with authoring tool 204 automatically creates at least one "top" division, illustrated in FIG. 4A as division 404A, and a child division, illustrated as division 406A. In the illustrative embodiment, division 404A, the top division, contains data members defining the global characteristics of a master document. However, the content of the document resides in the data members of the child division. Such an arrangement is initiated, by default, so that regardless of subsequent manipulation of the child divisions within a document there remains a single top division representative of the document. It will be obvious to those reasonably skilled in the arts that such an arrangement is not required by the inventive authoring tool. For example, a parent division may be created to represent a master document and may itself contain data content which may be freely manipulated. The properties of divisions 404A and 406A may be defined by the user or by default. The user may select one of a number of existing files as a template by which to create a division. Accordingly, the style, page layout, graphics, etc., of the selected file will define the objects contained within the content object, base object and division information object of divisions 404A and 406A. Once a document exists with a parent division and a child division, the user is free to create new divisions which are child divisions of either divisions 404A or 406B. For example, as illustrated, divisions 408A and 406A are both child divisions of parent division 404A and are siblings division to each other. FIG. 4B illustrates the object pointers 404B–418B of divisions 404A–418A, respectively, and their interrelationships of FIG. 4A.

Figure 5A:
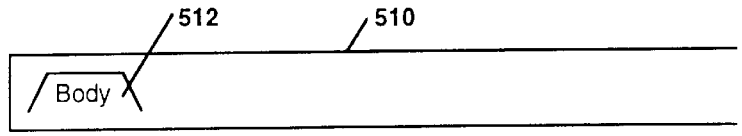
FIGS. 5A–E illustrate schematically the various elements of the graphic user interface presented during the creation and manipulation of divisions in accordance with the present invention.

Upon creation of a document by the user, a selectively hideable division tab bar 510 appears across the top of the document viewing area as illustrated in FIG. 5A. A single division tab 510 bearing the legend "body" is generated by default, in accordance with illustrative embodiment to indicate the top or parent division and the initial child division of a document upon creation. Once a document has been created with an initial child division, other divisions may be created accordingly.

Figure 5B:
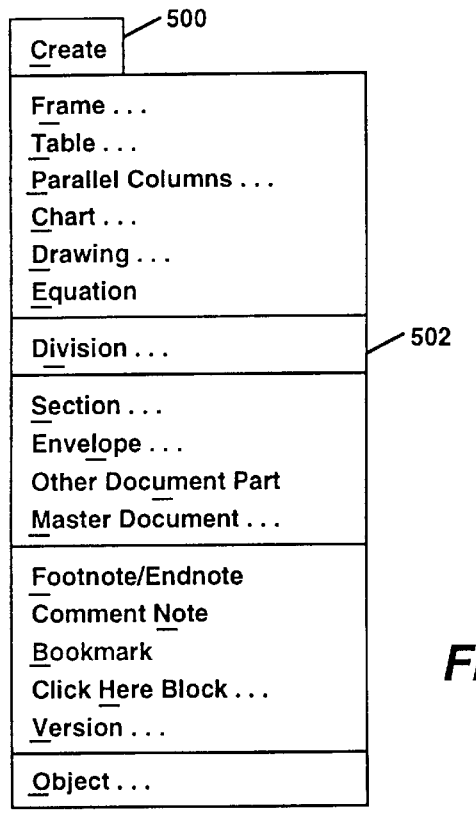

The creation of a child division may occur through the user invoking menu commands on the graphic interface of the application 206. In particular, by selecting the "Create" option 500 from a menu bar across the top of the application interface, a drop-down menu appears including a "Division" option 502, as illustrated in FIG. 5B. Selection of division option 502 invokes the inventive tool 204 and causes user interface 208 to present the dialog box 504, as illustrated in FIG. 5C. As illustrated, dialog box 504 provides the user with options to create the division from existing files or from a Smart Master. A Smart Master is a document template as implemented in Word Pro, 96 Edition, by Lotus Development Corporation. Dialog box 504 further provides virtual push buttons to browse additional files or connect directly to the Internet through application 206.

Figure 5D:
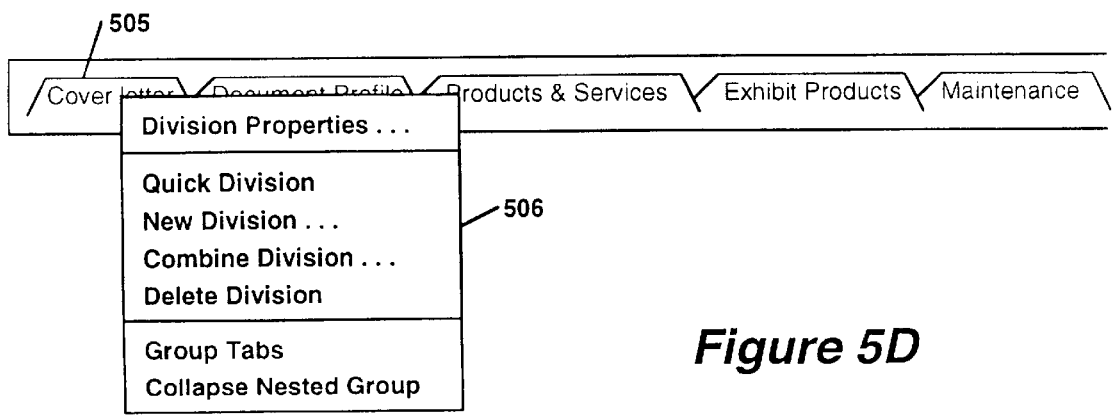
Figure 5C:
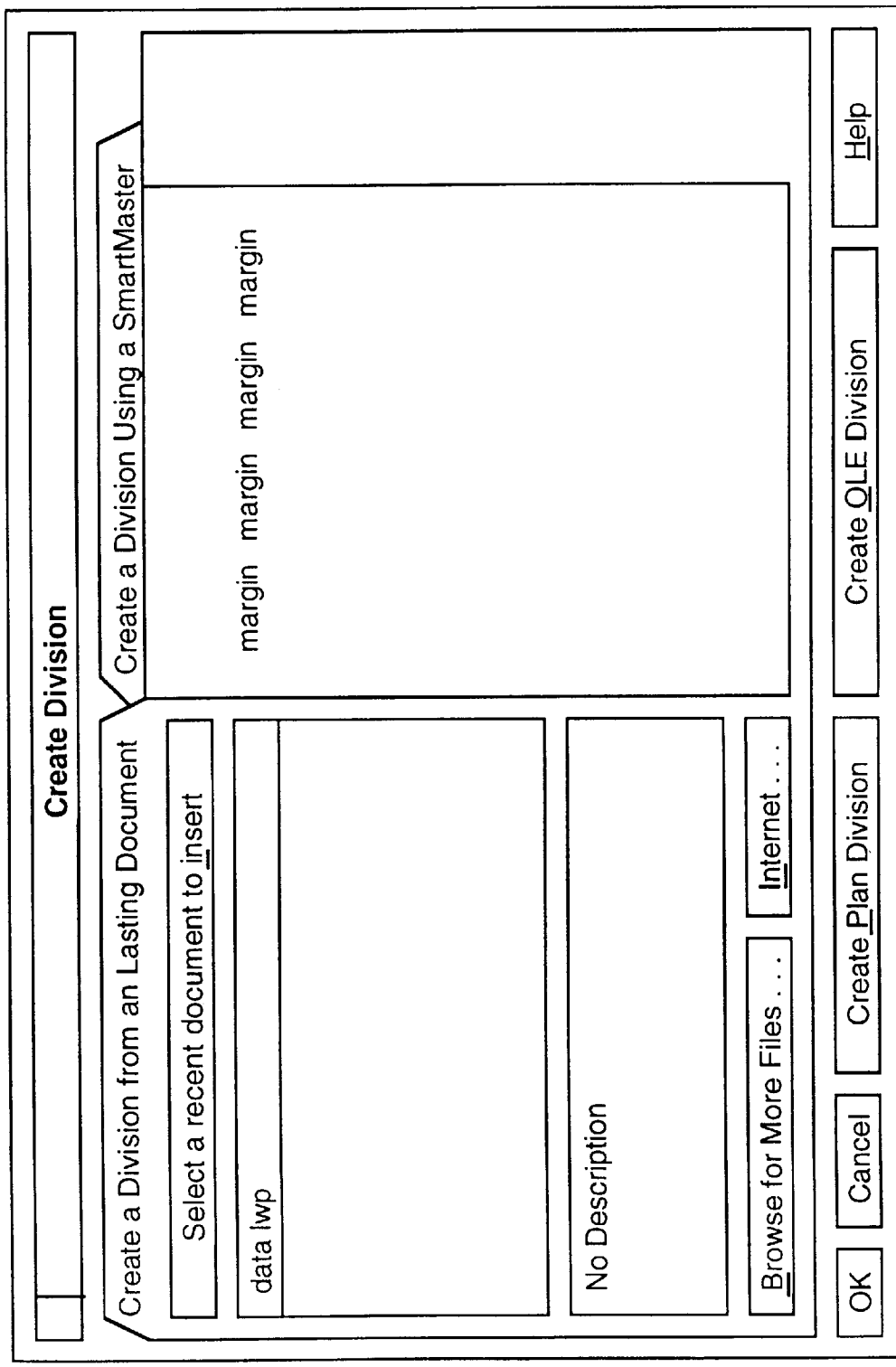
Figure 5E:
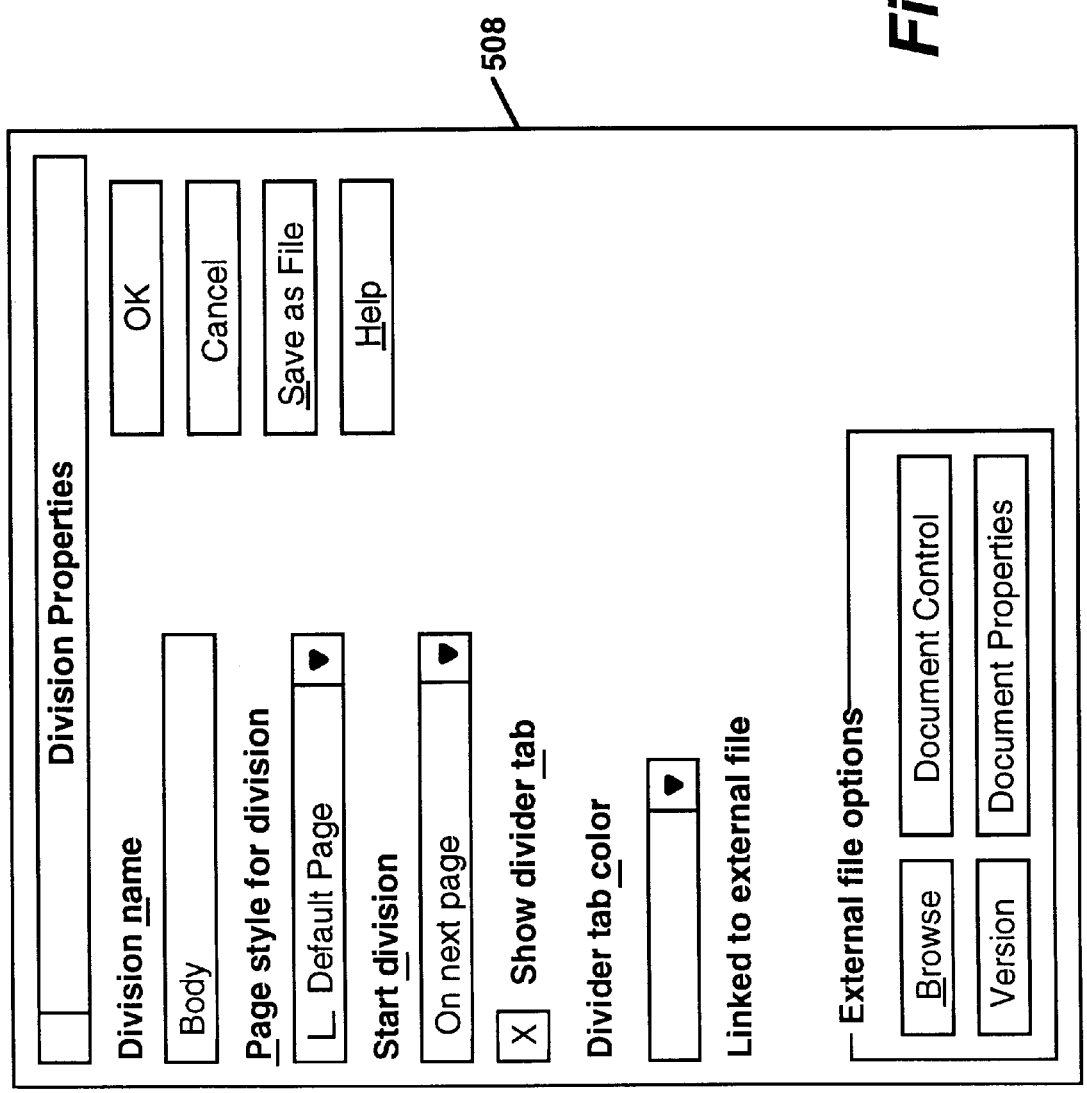

Alternatively, the user may select the divider tab 505 of an existing division and, by subsequently clicking the right mouse button, access the division menu 506, as illustrated in FIG. 5D. Selection of the "Division Properties" option from menu 506 will cause the dialog box 508 of FIG. 5E to appear. As illustrated, dialog box 508 includes additional dialog boxes which allow the user to select a name, page style, and a starting location for the division, as well as to select visibility and color options for the accompanying divider tab. Selection of the "Quick Division" option from menu 506 automatically creates a new division having all the characteristics and attributes of the division whose divider tab was selected. Selection of the "Combine Divisions" option of menu 506 causes a dialog box to appear which enables the user to select and combine any of the divisions existing within the current document, from a displayed list thereof. Selection of the "Delete Division" option automatically deletes the division whose divider tab was selected. Selection of the "Group Tabs" option for menu 506 causes a nesting effect, i.e., creation of a pseudo-parent division level between the selected division and its immediately proceeding parent division. Selecting the "Collapse Nested Group" division causes the divider tabs currently displayed within a group tab to become hidden.

The above-described operations occur through the interaction of word processing engine 205 with user interface 208 and authoring tool 204. Specifically, user interface 208 receives commands and data values relating to the subject objects and supplies them to word processing engine 205 which, in turn, interacts with tool 204 to make the appropriate changes into the object network representing the document, i.e., manipulation of the object pointers for the effected divisions. For example, creation of a division using a Smart Master file will cause the user interface 208 to command word processing engine 205 to create a division in accordance with the previously described document object model, such division having the characteristics and attributes of the selected Smart Master. Upon creation of the division, tool 204, in conjunction with word processing engine 205, sets the parent, child and sibling pointers of the newly created division in accordance with its location in the division hierarchy of the master document. In addition, the pointers of effected divisions within the hierarchy will be reset to point to the new division, as appropriate.

Creation of a new division using the Quick Division option causes user interface 208 to command word processing engine 205 to create a new division having attributes similar to the division referenced by the user. Again, word processing engine 205 and authoring 204 interact to set the parent, child and sibling pointers within the newly created division, and to make necessary modifications to the pointers within the existing hierarchy of divisions. Similar procedures occur for the deletion of a division. Specifically, the deletion request is received by user interface 208 and forwarded to word processing engine 205 which, in conjunction with tool 204, deletes the selected division and reconnects the pointer values of the remaining parent and child divisions within the hierarchy, as appropriate.

The Combine Division option, when selected, causes the user interface 208 to forward to word processing engine 205 a command to combine the divisions, indicated by the user, into a single division. When divisions are combined, the content of a division, as characterized by content object 304 of division object model 300, is merged into the content object of the selected division. In this manner, two divisions merged into a single division having the combined content of the two former divisions. However, in the illustrative embodiment, only sibling child processes are combinable, as parent divisions are typically void of content. As such, it is not possible to combine a child division with a parent division. However, it will be obvious to those skilled in the art that in an alternate embodiment, in which parent divisions may contain content, child divisions may be combined with a parent division. The resulting parent division containing the combined content. Authoring tool 204 and word processing engine 205 manipulate the pointer values of the combined division appropriately and modify the pointer values within the existing network of objects representing the other divisions within the document.

The selection of the Group Tabs option causes user interface 208 to forward to processing engine 205, a command to create a new parent division having the children divisions nested therein, as indicated by a user. Authoring tool 204 initializes the parent, child and sibling pointers of the group division appropriately and likewise modifies the pointers of the children divisions within the group division. In addition, modifications are made to other pointers, as required, within the object network representing the division hierarchy within the master document. Selection of the Collapsed Nested Group Option causes user interface 208 to modify the graphic representation, i.e., the divider tabs of the children divisions within the group division, so as not to be individually visible. Authoring tool 204 modifies the data members within the division information object of the children divisions to reflect their current status. However, no changes are made to the pointer values of the effected divisions as the hierarchy of divisions comprising the document has not been modified, only the divider tabs representing the individual divisions within the document. In the illustrative embodiment, a graphic element may be displayed on the divider tab such as a "+" or a "−" symbol to indicate whether the divider tab is expanded or collapsed, respectively.

In accordance with another embodiment of the present invention, a division, as defined in the illustrative embodiment, may contain a reference to a document which is external to the system on which the application is currently executing. As described with reference to FIG. 5C, the dialog box 504 used to create a division enables the user to connect to the Internet for selection of content subject matter. Upon selection of the push button bearing the legend "Internet," a dialog box appears which enables the user to connect to either an FTP-type server or a server on the World Wide Web. When creating a new division, if the user selects an external file, the external file name and path name are stored in attributes of the division information object of the division. In addition, the external and loaded attributes in the base object of the division are also set. Upon viewing the external document or printing the same, the document object pointer loads and links the external content into local memory for subsequent viewing and/or printing, as previously described. Referring to FIGS. 4A–B, a child division 412 is externally linked to divisions 414, 416, and 418. Division 414A serves as a top division, similar to division 404A, with the actual content of the external document residing in the data members of either division 416A or 418A. As illustrated in FIG. 4B, the child pointer of division 412B points to top division 414B of the external document. The content of child divisions 416 and 418 is copied into local memory by word processing engine 205 working in conjunction with network interface 216 and loader/linker code 212 when the user wishes to view the external content of the document. Because of the object definition of divisions in accordance with the present invention and their interrelated hierarchical structure, facilitated by the respective pointer objects of the divisions, it is possible to view an entire document, including any externally linked content from a single view within the user interface 208 in a continuous scrolling manner.

As an additional benefit of the object-based hierarchical arrangement of a document in accordance with the illustrative embodiment of the invention, different divisions within a document may be edited and or modified simultaneously by different users. The manner in which such concurrent accessing is possible is described in greater detail in the previously mentioned copending applications.

Figure 6A:
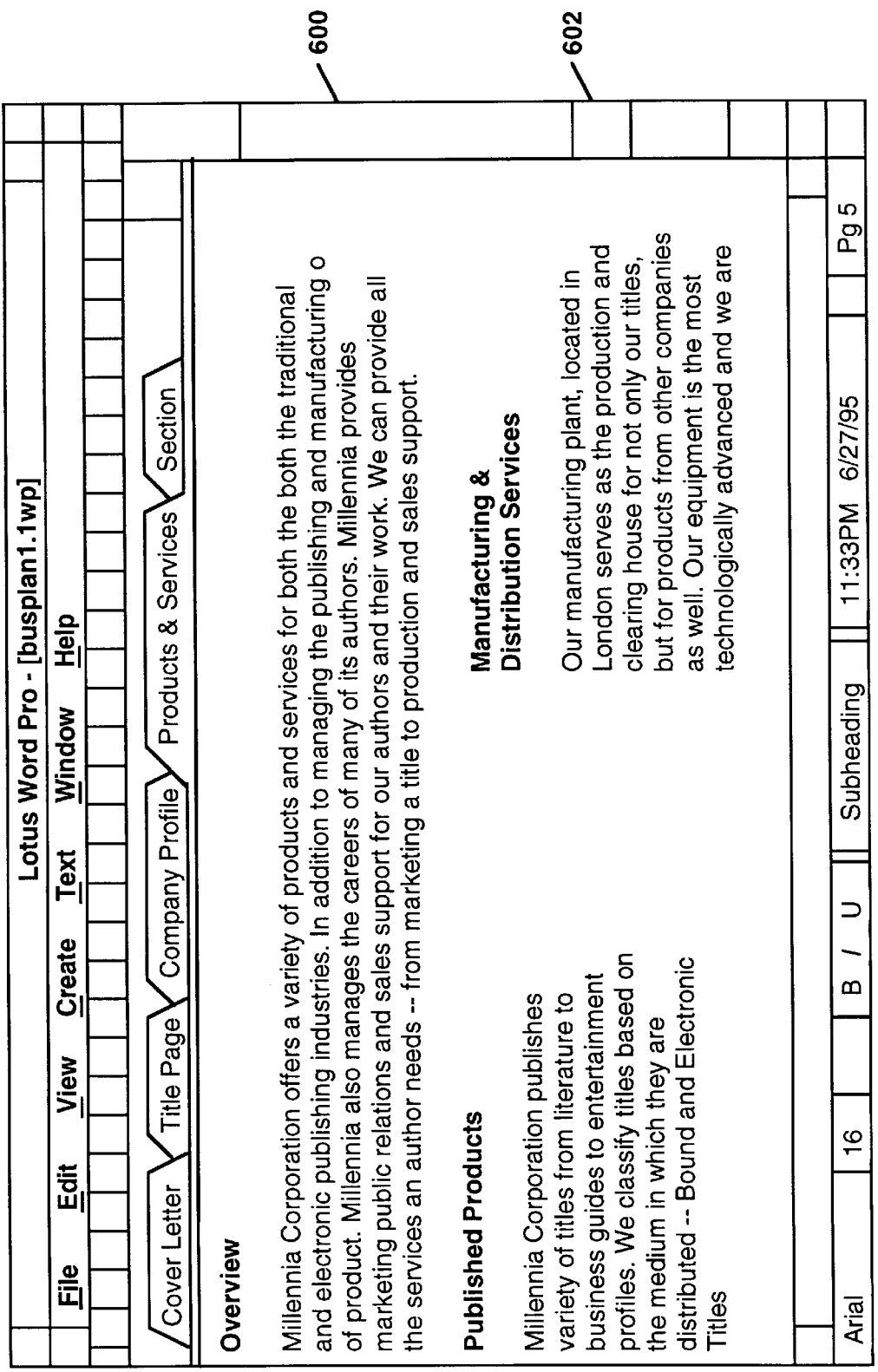
FIGS. 6A–C illustrate schematically the various elements of the graphic user interface presented in accordance with the page gauge aspect of the present invention.

In accordance with yet another aspect of the invention, a page gauge which dynamically displays the division name and page count is provided. Because of the object definition of divisions and their interrelated hierarchical structure within a master document, the dynamic display of a page and division information at a specific location within a document is possible, in response to a cursor position in a vertical scroll bar. Referring to FIG. 6A, the graphic interface as presented by Word Pro 96 is illustrated. In particular, a vertical scroll bar 600 is located in the right hand margin of the display. Within the vertical scroll bar, a cursor or position indicator 602 resides. Using a pointing device, such as a mouse, cursor 602 may be positioned anywhere within the extent of scroll bar 600. Positioning of the cursor may be achieved with a mouse by either a) positioning the mouse pointer on the cursor and with the left mouse button depressed, dragging the cursor to the desired position within the vertical shaft, or b) placing the mouse pointer at a region within the shaft and depressing the left mouse button thereby causing the scroll bar to change the cursor position automatically at a predetermined rate and in a direction toward an extreme of the shaft, i.e., placing the pointer above the cursor causes the shaft to scroll upward; placing the pointer below the cursor causes the shaft to scroll downwards. The construction and function of vertical scroll bars is well known to those reasonably skilled in the art and will not be described in greater detail hereinafter.

Figure 6B:
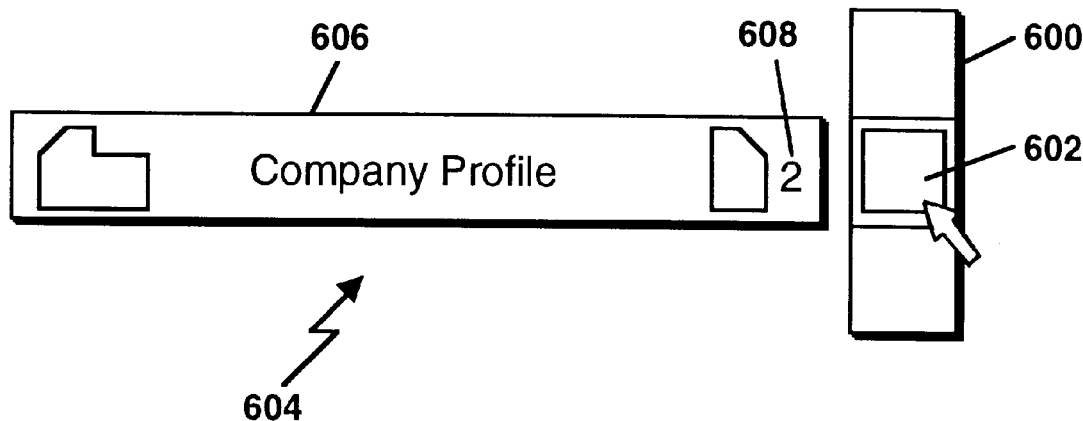
Figure 6C:
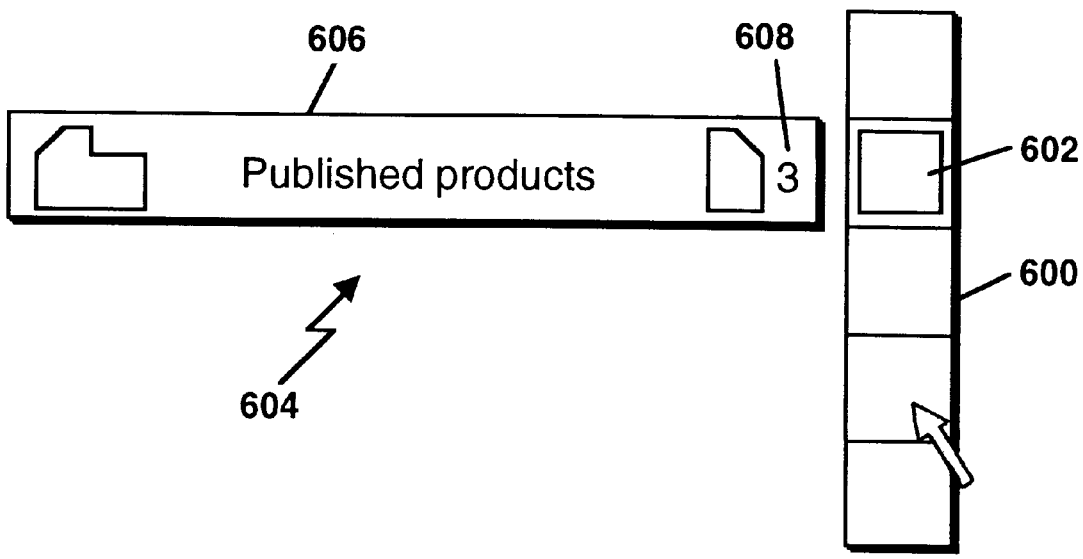

Referring to FIG. 6B a page gauge 604 in accordance with the invention is illustrated. Page gauge 604 provides a display region which is dynamically updatable depending on the position of the cursor within vertical scroll bar 600. In particular, page gauge 604 comprises a division legend 606 and a page legend 608, as illustrated. In the illustrative embodiment, page gauge 604 is hidden until the mouse pointer is placed on cursor 602 and the left mouse button pressed, at which time, page gauge 604 appears. Since the position of cursor 602 within scroll bar 600 represents a specific location within a master document, the name of the division and the number of the page within the document are calculated and displayed in accordance with the position of the cursor. If the left mouse button remains depressed while repositioning the cursor, i.e. dragging the cursor up or down within the vertical shaft of the scroll bar, the page gauge dynamically updates the division legend 606 and page count number 608. As illustrated in FIG. 6C, the user can drag the cursor 602, illustrated in phantom, and, based on the values displayed in page gauge 604 position the cursor exactly at a desired point within the document. In this manner, page gauge 604 provides a mechanism for positioning the cursor exactly where desired within the document, without having to repeatedly manipulate the cursor position within scroll bar.

Figure 7:
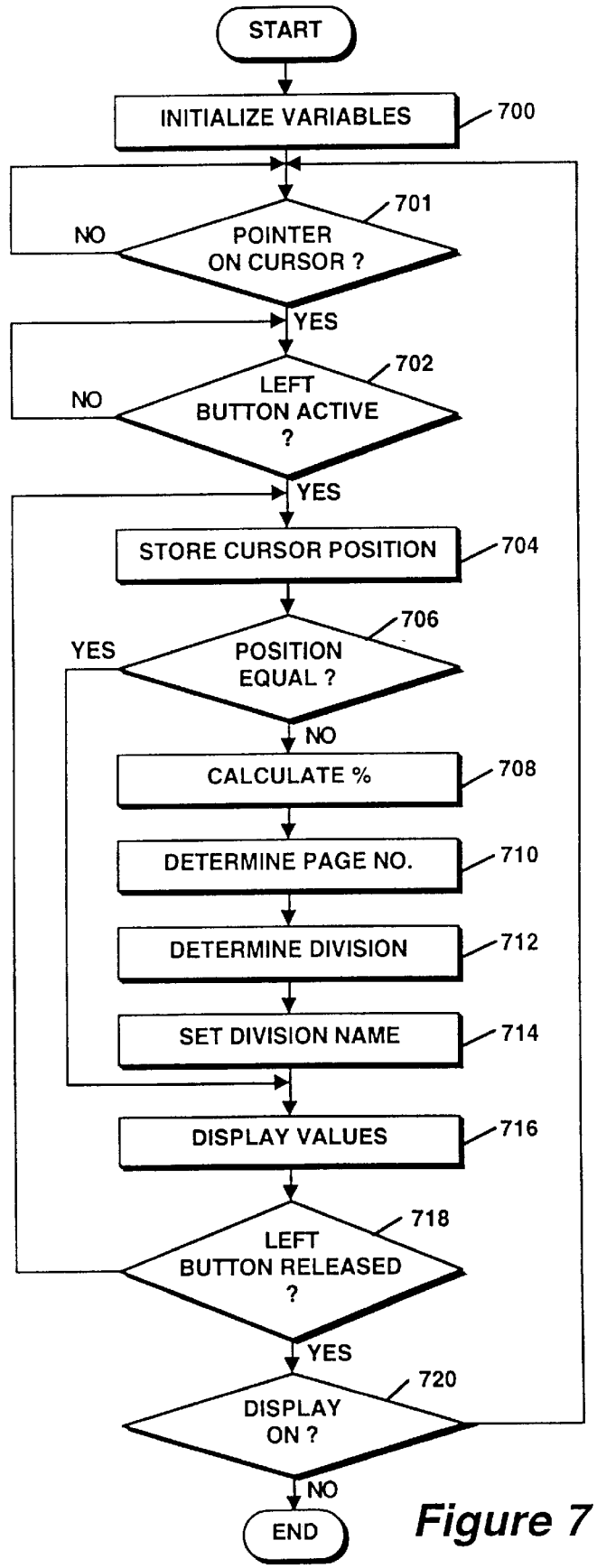
FIG. 7 is a flowchart illustrating the algorithmic steps in accordance with the page gauge aspect of the present division.

The functional operation of page gauge 604 is described with reference to the flowchart in FIG. 7. Specifically, user interface 208 operates in conjunction with tool 204 and word processing engine 205 to execute the algorithm steps illustrated in FIG. 7. Upon viewing of a document with word processing application 206, similar to the view illustrated in FIG. 6A, a number of variables, necessary for implementation of the inventive page gauge, are initialized in memory. In particular, a DIVISION NAME variable, which may be implemented as a character string, is initialized to the name of the division currently displayed by application 206. In a similar manner, a PAGE NO. variable, which may be implemented as an integer value, is initialized to the number of the page currently displayed by application 206. A PAGE COUNT variable, which may be implemented as an integer value, is initialized to the total number of pages currently existing in the document being displayed by application 206. A CURSOR variable, which may be implemented as an integer or a floating point number, is initialized to the current position of the cursor upon initiation of the document viewing process by application 206. These initialization processes are illustrated schematically by procedural block 700 of FIG. 7.

The inventive authoring tool 204 detects whether the mouse pointer is positioned over cursor 602, as illustrated by decision of block 701. If so, the inventive tool next detects whether the left mouse button has been depressed, as illustrated in decisional block 702. If so, the position of the cursor 602 within vertical scroll bar 600 is written into a buffer, as illustrated in procedural block 704. Next, the temporary value of the cursor position in the buffer is compared against the value of the CURSOR variable, as illustrated by decisional block 806. If the values match, the values of the DIVISION NAME and PAGE NO. variables are displayed in page gauge 604, as indicated by procedural block 716. If, however, the values are not equal, CURSOR variable is set equal to the value of the cursor position in the buffer. Using the value of CURSOR variable, the position of the cursor is calculated as a percentage of the total extent of travel within the vertical shaft, in a manner within the scope of understanding of those skilled in the arts, as illustrated by procedural block 708. The resulting percentage value is then multiplied by the value of the PAGE COUNT page variable, and the PAGE NO. variable set equal to the result thereof, as illustrated by procedural block 710. The value of the PAGE NO. variable accordingly represents the page number within the document, as currently represented by the position of the cursor. Next, tool 204 uses the value of the PAGE NO. variable and the data members of the various objects comprising each division within the master document to determine the corresponding value of the DIVISION NAME variable, i.e., the name of the division, as illustrated by procedural block 712. In the illustrative embodiment, tool 204 traverses the hierarchy of divisions comprising the document, and, utilizes the values of their object data members representing the number of pages within each division, to determine which division corresponds to the cursor position. For example, in a master document comprising of five divisions each having ten pages per division, a PAGE NO. number value of forty-five would correspond to the name of the fifth division. Note this result will be the same whether the divisions are siblings of a common parent or in a nested hierarchy.

Next, the DIVISION NAME variable is set equal to the name of the division corresponding to the position of the cursor, as illustrated by procedural block 714, and the values of the PAGE NO. and DIVISION NAME variables are displayed in page gauge 604, as illustrated by procedural block 716. Next, a determination is made as to whether the left mouse button has been released, as illustrated by decisional block 718. If the left mouse button has not been released, procedural flow returns to block 704 where the current value of the cursor position is read into a temporary buffer and the whole algorithmic process repeated. In this manner, the cursor may be dragged, and, as long as the left mouse button remains depressed, page gauge 604 will dynamically display the instantaneous division name and page number of the position within the document as represented by the cursor at any given instance. Typically, the page gauge values change almost in real time as the cursor scrolls through the extent of the vertical scroll bar. If the mouse button has been released, a determination is made as to whether or not the document is still being displayed, as illustrated by decisional block 720. If the document is still displayed, process flow returns to just prior to decisional block 701, as illustrated. However, if a document is no longer being displayed, the inventive process ends.

Although several embodiments of the invention have been disclosed, it will be apparent to those skilled in the art that various changes and modifications can be made which will achieve some of the advantages of the invention without departing from the spirit and scope of the invention. These and other obvious modifications are intended to be covered by the following claims.

What is claimed is:

1. A computer program product for use with a computer system, the computer system having local storage and a visual display and being connected, via a computer network, to other computer systems, the computer program product comprising a computer usable medium having program code embodied in the medium for allowing users to create a single virtual document from a plurality of independently-created and edited documents, the program code including:

program code for creating a plurality of division containers, at least one of the division containers including a content pointer which references document content information in one of the plurality of documents;

program code which responds to user commands by forming the plurality of division containers into an arbitrary hierarchy by inserting at least one pointer into each of the division containers which pointer references another of the plurality of division containers; and program code for traversing the hierarchy and loading into the local storage a copy of document content information referenced by each division container encountered in the traversed hierarchy portion so that the document content information from all referenced documents can be manipulated as if it were the document content information of a single document.

2. The computer program product of claim 1 further comprising program code for displaying on the display the document content information from all referenced documents.

3. The computer program product of claim 2 wherein each division container has associated therewith a graphic element which uniquely identifies the division container in an iconic manner and wherein program code for displaying further comprises program code for displaying such graphic elements in a manner which represents relationships among the division containers.

4. The computer program product of claim 1 further comprising program code for continuously scrolling on the display the document content information from all referenced documents.

5. The computer program product of claim 4 further comprising program code for dynamically displaying during the scrolling, identification information for a division object which has document content information displayed on the display.

6. The computer program product of claim 5 wherein the identification in formation comprises information identifying the division object which has document content information displayed on the display and information identifying a location within the document content information.

7. The computer program product of claim 1 where in the program code for loading into the local storage a copy of document content information comprises linker/loader program code which retrieves a copy of document content information from the local storage when a content pointer in a division object traversed in the hierarchy references content information in the computer system and which retrieves a copy of document content information over the network into the computer system when a content pointer in a division object traversed in the hierarchy references content information in a computer system other than the computer system.

8. The computer program product of claim 1 further comprising program code which responds to user commands for reconfiguring the arbitrary hierarchy by changing the pointer in at least one of the division containers to reference another of the plurality of division containers.

9. The computer program product of claim 1 wherein each division object includes formatting information and the program code further includes program code which is responsive to the formatting information in a division object for formatting for display the document content information referenced by the division object.

10. The computer program product of claim 1 further comprising program code which combines a plurality of division containers by merging the content information in each of the plurality of documents referenced by the plurality of division containers.

11. The computer program product of claim 1 further comprising program code for deleting a division object by manipulating the pointers in the hierarchy.

12. Apparatus for use with a computer system, the computer system having local storage and a visual display and being connected, via a computer network, to other computer systems, the apparatus allowing users to create a single virtual document from a plurality of independently-created and edited documents and comprising:

a container mechanism which creates a plurality of division containers, at least one of the division containers including a content pointer which references document content information in one of the plurality of documents;

a configuration mechanism which responds to user commands by forming the plurality of division containers into an arbitrary hierarchy by inserting at least one pointer into each of the division containers which pointer references another of the plurality of division containers; and a linker/loader which traverses the hierarchy and loads into the local storage a copy of document content information referenced by each division container encountered in the traversed hierarchy portion so that the document content information from all referenced documents can be manipulated as if it were the document content information of a single document.

13. The apparatus of claim 12 further comprising renderer for displaying on the display the document content information from all referenced documents.

14. The apparatus of claim 13 wherein each division container has associated therewith a graphic element which uniquely identifies the division container in an iconic manner and wherein the renderer further comprises a mechanism for displaying such graphic elements in a manner which represents relationships among the division containers.

15. The apparatus of claim 12 further comprising a scroller for continuously scrolling on the display the document content information from all referenced documents.

16. The apparatus of claim 15 further comprising a mechanism for dynamically displaying during the scrolling, identification information for a division object which has document content information displayed on the display.

17. The apparatus of claim 16 wherein the identification information comprises information identifying the division object which has document content information displayed on the display and information identifying a location within the document content information.

18. The apparatus of claim 12 wherein the linker/loader comprises a loader which retrieves a copy of document content information from the local storage when a content pointer in a division object traversed in the hierarchy references content information in the computer system and which retrieves a copy of document content information over the network into the computer system when a content pointer in a division object traversed in the hierarchy references content information in a computer system other than the computer system.

19. The apparatus of claim 12 further comprising a reconfiguration mechanism which responds to user commands for reconfiguring the arbitrary hierarchy by changing the pointer in at least one of the division containers to reference another of the plurality of division containers.

20. The apparatus of claim 12 wherein each division object includes formatting information and the apparatus further includes a formatter which is responsive to the formatting information in a division object for formatting for display the document content information referenced by the division object.

21. The apparatus of claim 12 further comprising a document manipulation mechanism which combines a plurality of division containers by merging the content information in each of the plurality of documents referenced by the plurality of division containers.

22. The apparatus of claim 12 further comprising a document deletion mechanism for deleting a division object by manipulating the pointers in the hierarchy.

23. A method for use with a computer system, the computer system having local storage and a visual display and being connected, via a computer network, to other computer systems, the method allowing users to create a single virtual document from a plurality of independently-created and edited documents and comprising the steps of:
    (a) creating a plurality of division containers, at least one of the division containers including a content pointer which references document content information in one of the plurality of documents;
    (b) forming, in response to user commands, the plurality of division containers into an arbitrary hierarchy by inserting at least one pointer into each of the division containers which pointer references another of the plurality of division containers; and
    (c) traversing the hierarchy and loading into the local storage a copy of document content information referenced by each division container encountered in the traversed hierarchy portion so that the document content information from all referenced documents can be manipulated as if it were the document content information of a single document.

24. The method of claim 23 further comprising the step of:
    (d) displaying on the display the document content information from all referenced documents.

25. The method of claim 24 wherein each division container has associated therewith a graphic element which uniquely identifies the division container in an iconic manner and wherein step (d) comprises the step of:
    (d1) program code for visually displaying further comprises program code for displaying such graphic elements in a manner which represents relationships among the division containers.

26. The method of claim 23 further comprising the step of:
    (e) continuously scrolling on the display the document content information from all referenced documents.

27. The method of claim 26 further comprising the step of:
    (f) dynamically displaying during the scrolling, identification information for a division object which has document content information displayed on the display.

28. The method of claim 27 wherein the identification information comprises information identifying the division object which has document content information displayed on the display and information identifying a location within the document content information.

29. The method of claim 23 wherein step (c) comprises the steps of:
    (c1) retrieving a copy of document content information from the local storage when a content pointer in a division object traversed in the hierarchy references content information in the computer system; and
    (c2) retrieving a copy of document content information over the network into the computer system when a content pointer in a division object traversed in the hierarchy references content information in a computer system other than the computer system.

30. The method of claim 23 further comprising the step of:
    (g) reconfiguring the arbitrary hierarchy in response to user commands by changing the pointer in at least one of the division containers to reference another of the plurality of division containers.

31. The method of claim 23 wherein each division object includes formatting information and the method further includes the step of:
    (h) formatting for display the document content information referenced by the division object using the formatting information in a division object.

32. The method of claim 23 further comprising the step of:
    (i) combining a plurality of division containers by merging the content information in each of the plurality of documents referenced by the plurality of division containers.

33. The method of claim 23 further comprising the step of:
    (j) deleting a division object by manipulating the pointers in the hierarchy.

34. A computer data signal embodied in a carrier wave for allowing users to create a single virtual document from a plurality of independently-created and edited documents comprising:
    program code for creating a plurality of division containers in the memory of a computer system, at least one of the division containers including a content pointer which references document content information in one of the plurality of documents;
    program code which responds to user commands entered into the computer system by forming the plurality of division containers into an arbitrary hierarchy by inserting at least one pointer into each of the division containers which pointer references another of the plurality of division containers; and
    program code for traversing the hierarchy and loading into local storage of the computer system a copy of document content information referenced by each division container encountered in the traversed hierarchy portion so that the document content information from all referenced documents can be manipulated as if it were the document content information of a single document.

35. The computer data signal of claim 34 further comprising program code for displaying on a display associated with the computer system the document content information from all referenced documents.

36. The computer data signal of claim 35 wherein each division container has associated therewith a graphic element which uniquely identifies the division container in an iconic manner and wherein program code for visually displaying further comprises program code for displaying such graphic elements in a manner which represents relationships among the division containers.

37. The computer data signal of claim 34 further comprising program code for continuously scrolling on a display associated with the computer system the document content information from all referenced documents.

38. The computer data signal of claim 37 further comprising program code for dynamically displaying during the scrolling, identification information for a division object which has document content information displayed on a display associated with the computer system.

39. The computer data signal of claim 38 wherein the identification information comprises information identifying the division object which has document content information displayed on the display and information identifying a location within the document content information.

40. The computer data signal of claim 34 wherein the program code for loading into the local storage a copy of document content information comprises linker/loader program code which retrieves a copy of document content information from the local storage when a content pointer in a division object traversed in the hierarchy references content information in the computer system and which retrieves a copy of document content information over the network into the computer system when a content pointer in a division object traversed in the hierarchy references content information in a computer system other than the computer system.

41. The computer data signal of claim 34 further comprising program code which responds to user commands for reconfiguring the arbitrary hierarchy by changing the pointer in at least one of the division containers to reference another of the plurality of division containers.

42. The computer data signal of claim 34 wherein each division object includes formatting information and the program code further includes program code which is responsive to the formatting information in a division object for formatting for display the document content information referenced by the division object.

43. The computer data signal of claim 34 further comprising program code which combines a plurality of division containers by merging the content information in each of the plurality of documents referenced by the plurality of division containers.

44. The computer data signal of claim 34 further comprising program code for deleting a division object by manipulating the pointers in the hierarchy.

* * * * *